Feb. 18, 1930.  A. L. V. C. DEBRIE  1,747,931
FILM MAGAZINE
Filed Sept. 6, 1927   2 Sheets-Sheet 1

Inventor
A.L.V.C. Debrie,
By Langner, Parry, Card & Langner
Attys.

Feb. 18, 1930.  A. L. V. C. DEBRIE  1,747,931
FILM MAGAZINE
Filed Sept. 6, 1927    2 Sheets-Sheet 2

Inventor:-
A.L.V. C. Debrie
by Laugnier, Parry, Cardf Laugnier
Attys.

Patented Feb. 18, 1930

1,747,931

UNITED STATES PATENT OFFICE

ANDRÉ LÉON VICTOR CLEMENT DEBRIE, OF PARIS, FRANCE

FILM MAGAZINE

Application filed September 6, 1927, Serial No. 217,860, and in France October 18, 1926.

It is of the greatest importance in view of avoiding a certain number of manipulations of winding and unwinding of the film, to keep and carry the films whether impressed, unimpressed or revealed as negatives or positives in the same magazine boxes which contain them during the operations of view taking, printing, projecting, etc.

But the difficulty of operating in this manner is due to the fact that during transportation the film must be held very tightly in its box so as not to unwind whereas during the several operations mentioned hereinabove a certain play should exist between the box and the film so as to allow the free winding or unwinding of the latter.

Now the present invention has for its object a yielding film magazine which can be secured inside a view taking apparatus, a projecting apparatus etc. and is provided with an aperture for allowing the film to pass and adapted to be made perfectly light tight for transportation; this box is made so as to keep normally the film very tight, whereas when the said opening is released inside the view taking or projecting apparatus for letting the film pass, it gives the latter sufficient play for its free winding or unwinding.

This arrangement may be executed in several manners. In particular the box may simply comprise two cylinders the height of which is equal to the width of the film, fitting exactly in one another and provided each with a cover. Besides these two cylinders which may rotate coaxially one with reference to the other, are provided each on their periphery with an opening; these openings when they are in front of one another afford a free passage for the film from outside to inside and vice versa. According to the present invention, this relative movement of the cylindrical elements is accompanied by a screwing or unscrewing motion of one element with reference to the other whereby the two ends of the box move towards or away from each other, the closest drawing together being obtained when the two lateral apertures are not in coincidence and the maximum distance corresponding to the opening of the passage for the film. This helical movement may be obtained either by screwing one of the cylinders in the other or by means of grooves of suitable shape and arrangement provided in the wall of one of the cylinders and wherein studs borne by the other cylinder are adapted to move.

The device may be completed by a hub arrangement serving as a spool round which the reel is wound, rotating inside the two ends of the box without being detrimental to the tightness with the latter and affording sufficient play for the good working of the apparatus.

A form of execution of the invention is shown by way of example on appended drawings wherein.

Figure 4:
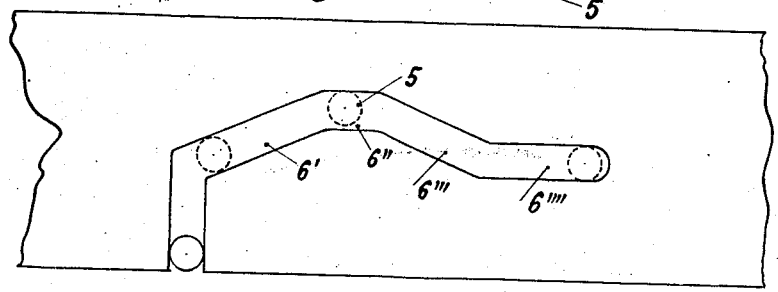
Fig. 4 is a development of the outer wall of the cylinder showing a modified form of the groove arrangement.

The box comprises two cylinders 1 and 2 the height of which is equal to the width of the band. They are each provided with a cover, the covers facing each other so as to constitute a closed system. These two cylinders are each provided on their periphery with an aperture, respectively 3 and 4 of sufficient size for allowing the film to pass when they are opposite each other. One of the cylinders, for instance the outer half-magazine 1 bears from place to place studs such as 5; each of these studs engages a groove 6 provided in the wall of the box 2 and which is disposed obliquely or suitably incurved. This groove may also be disposed as illustrated on Fig. 4 and comprise an oblique part 6′, a part 6″ having the direction of the cross section, an oblique part 6‴ disposed reversely to 6′ and a part 6⁗ also disposed along a cross section, so that when the parts 1 and 2 are rotated one with reference to the other, the covers move first apart and then towards each other.

Figure 3:
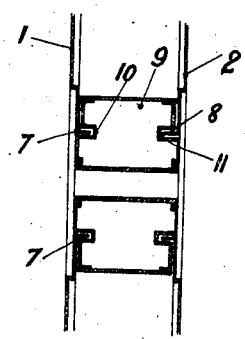
Fig. 3 is a cross-section of the hub alone.
Figure 2:
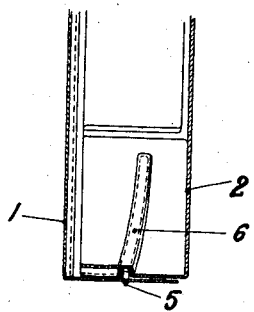
Fig. 2 is a partial cross-sectional view of the magazine.

The cover of each of the two cylinders 1 and 2 is stamped out in its center so as to form an inner flange, respectively 7 and 8 (Fig. 3). These flanges serve as bearings for the hub 9 constituted by a cylindrical block on each of the end surfaces of which is provided a coaxial groove 10, 11 having a certain depth and engaged by the flange 7 or 8. This groove is sufficiently wide to allow the free rotation of the hub 9 forming a spool for receiving the film. It is evident that the tightness of the box is thus perfectly ensured.

Figure 1:
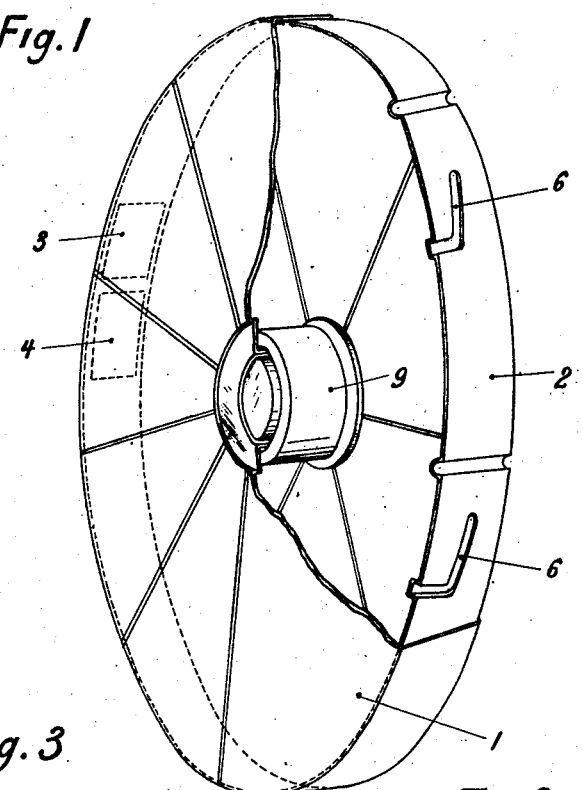
Fig. 1 is a perspective view of the whole magazine.

The operation is as follows: During transportation, the apertures 3 and 4 are not in front of one another and the cylinders 1 and 2 engage each other completely (position shown on Fig. 1). The film is thus tightly held by its edges between the covers of these two half magazines. On the contrary when the film is to be unwound in the view taking or projecting apparatus the two half-magazines 1 and 2 are made to rotate one with reference to the other, until the apertures 3 and 4 are in coincidence and allow the film to pass. But during this rotation due to the studs 5 and the grooves 6, the half boxes are slightly disengaged whereby sufficient play exists in the magazine for allowing a free winding or unwinding of the film.

Figure 5:
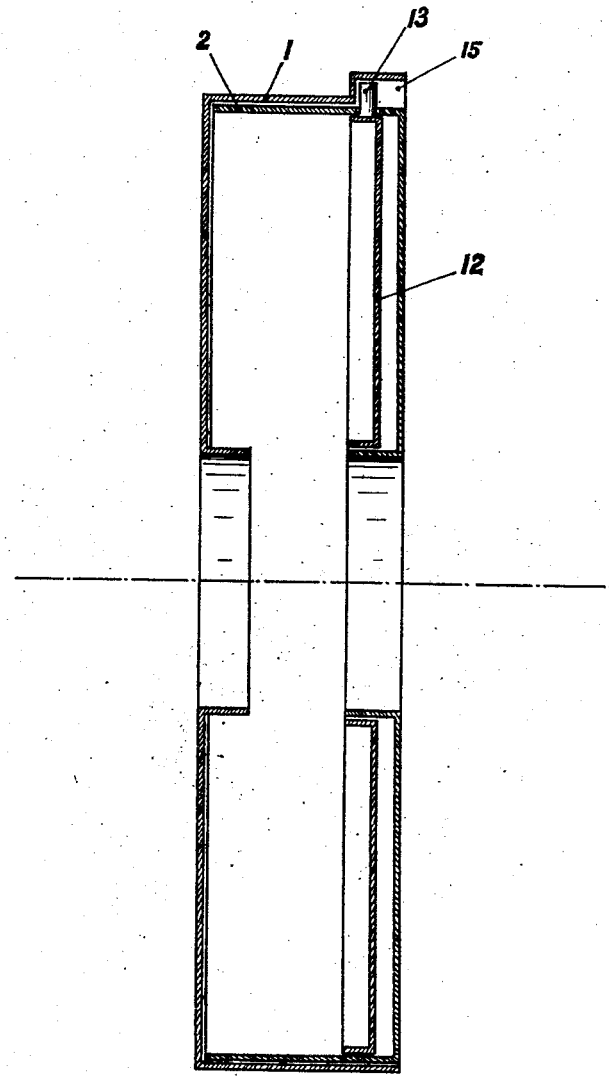
Fig. 5 illustrates a modified form of the box.

The above described form of execution has been given only by way of example and might be replaced by any other giving the desired result. Thus for instance the half-magazines 1 and 2 might simply rotate one with reference to the other and contain a movable cover or false bottom 12 (Fig. 5) in front of its end wall which might move remaining parallel to itself so as to press down more or less the film; this cover, the movements of which which would be controlled from outside the magazine for instance by means of a stud 13 integral therewith passing through a helical slot in the corresponding casing 2 and engaging a recess 15 in the other casing 1, would be disposed so as to release the film when the two half magazines rotate one with reference to the other for affording a passage for the film.

What I claim is:

1. A film magazine for cinematographic apparatuses comprising two slidable and rotatably interengaging cylindrical members closed at one end and provided each with a lateral aperture, a cylindrical hub arrangement adapted to rotate freely inside and coaxial with said members and on which the film is adapted to be wound, and guiding means for setting the lateral apertures in correspondency when the cylindrical members are moved furthest apart and to put them out of correspondency when the ends of said members are pushed toward one another and against the edges of the film.

2. A film magazine for cinematographic apparatuses comprising two slidably and rotatably interengaging cylindrical members closed at one end and provided each with a lateral aperture, a series of slots being provided on one of the members and showing a succession of portions disposed in angular relationship, a cylindrical hub arrangement disposed inside and coaxial with said members and on which the film is adapted to be wound and studs provided on the non-slotted member engaging the slots in the other member and adapted to guide the relative movement of the cylindrical members whereby the lateral apertures therein are set in correspondency when the said members are moved furthest apart and are put out of correspondency when they are pushed towards one another and against the edges of the film.

In testimony whereof I have signed my name to this specification.

ANDRÉ LÉON VICTOR CLEMENT DEBRIE.